US009727481B2

(12) United States Patent
Shetty et al.

(10) Patent No.: US 9,727,481 B2
(45) Date of Patent: Aug. 8, 2017

(54) CACHE EVICTION OF INACTIVE BLOCKS USING HEAT SIGNATURE

(71) Applicant: Nimble Storage, Inc., San Jose, CA (US)

(72) Inventors: Pradeep Shetty, San Jose, CA (US); Senthil Kumar Ramamoorthy, San Jose, CA (US); Umesh Maheshwari, San Jose, CA (US); Vanco Buca, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/019,909

(22) Filed: Feb. 9, 2016

(65) Prior Publication Data

US 2017/0060764 A1    Mar. 2, 2017

Related U.S. Application Data

(60) Provisional application No. 62/209,807, filed on Aug. 25, 2015.

(51) Int. Cl.
*G06F 12/12*       (2016.01)
*G06F 12/0891*    (2016.01)
*G06F 12/0893*    (2016.01)
*G06F 3/06*         (2006.01)

(52) U.S. Cl.
CPC .......... *G06F 12/0891* (2013.01); *G06F 3/061* (2013.01); *G06F 3/064* (2013.01); *G06F 3/0653* (2013.01); *G06F 3/0685* (2013.01); *G06F 12/0893* (2013.01); *G06F 2212/1021* (2013.01); *G06F 2212/222* (2013.01); *G06F 2212/60* (2013.01)

(58) Field of Classification Search
CPC ..... G06F 12/0891; G06F 3/0653; G06F 3/061
USPC ......................................................... 711/118
See application file for complete search history.

(56) References Cited

U.S. PATENT DOCUMENTS

2009/0204765 A1* 8/2009 Gupta ................... G06F 12/121
                                                                                                711/133

* cited by examiner

*Primary Examiner* — Jae Yu
(74) *Attorney, Agent, or Firm* — Martine Penilla Group, LLP

(57) ABSTRACT

Methods and systems are presented for evicting or copying-forward blocks in a storage system during garbage collection. In one method, a block status is maintained in a first memory to identify if the block is active or inactive, blocks being stored in segments that are configured to be cacheable in a second memory, a read-cache memory. Whenever an operation on a block is detected making the block inactive in one volume, the system determines if the block is still active in any volume, the block being cached in a first segment in the second memory. When the system detects that the first segment is being evicted from the second memory, the system re-caches the block into a second segment in the second memory if the block status of the block is active and the frequency of access to the block is above a predetermined value.

20 Claims, 12 Drawing Sheets

Flash includes segments and segments include blocks that may be of different size

CACHE EVICTION OF INACTIVE BLOCKS USING HEAT SIGNATURE

CLAIM OF PRIORITY

This application claims priority from U.S. Provisional Patent Application No. 62/209,807, filed Aug. 25, 2015, and entitled "Cache Eviction of Inactive Blocks Using Heat Signature," which is herein incorporated by reference.

CROSS REFERENCE TO RELATED APPLICATIONS

This application is related to U.S. patent application Ser. No. 14/623,731, filed Feb. 17, 2015, and entitled "Access-Based Eviction of Blocks from Solid State Drive Cache Memory," which is incorporated herein by reference.

BACKGROUND

1. Field of the Invention

The present embodiments relate to methods, systems, and programs for managing resources in a networked storage system, and more particularly, methods, systems, and computer programs for managing a cache memory.

2. Description of the Related Art

Network storage, also referred to as network storage systems or storage systems, is computer data storage connected to a computer network providing data access to heterogeneous clients. Typically network storage systems process a large amount of Input/Output (IO) requests, and high availability, speed, and reliability are desirable characteristics of network storage.

One way to provide quick access to data is by utilizing fast cache memory to store data. Since the difference in access times between a cache memory and a hard drive are significant, the overall performance of the system is highly impacted by the cache hit ratio. Therefore, it is important to provide optimal utilization of the cache memory in order to have in cache the data that is accessed most often.

What is needed is a network storage device, software, and systems that provide for optimal utilization of cache memory in order to provide a high cache hit ratio by keeping in cache the data that is accessed the most.

It is in this context that embodiments arise.

SUMMARY

The present embodiments relate to managing cache memory. Blocks of data are kept in cache memory based on the frequency of access and based on whether the blocks of data are still active. Active blocks are those blocks that contain data accessible by a host and that are not exclusively part of a snapshot. In one embodiment, the unit for storing data in the cache memory is a segment, which holds a plurality of blocks.

A system of one or more computers can be configured to perform particular operations or actions by virtue of having software, firmware, hardware, or a combination of them installed on the system that in operation cause the system to perform the actions. One method includes maintaining, in a first memory of a storage system, a block status for each of a plurality of blocks, the block status identifying if the corresponding block is active in any volume of the storage system, each block being associated with one or more volumes and each block being stored within one segment of a plurality of segments, where the plurality of segments is configured to be cacheable in a second memory that is a read cache memory. The method also includes, whenever an operation on a block is detected that makes the block inactive in at least one volume, determining if the block is active in any volume, the block being cached within a first segment in the second memory. The method also includes, when the block is not active in any volume, setting the block status of the block as inactive. The method also includes detecting that the first segment is being evicted from the second memory, and re-caching, in response to the eviction of the first segment, the block into a second segment in the second memory when the block status of the block is active and a frequency of access to the block is above a predetermined value.

One storage device includes a first memory, a second memory, a third memory, and a processor. The first memory is configured to store a block status for each of a plurality of blocks, the block status identifying if the corresponding block is active in any volume of the storage system. The second memory is for caching segments from a plurality of segments, the second memory being a read cache memory, where each block is associated with one or more volumes and each block is stored within one segment from the plurality of segments. The third memory is for storing the plurality of segments. The processor is configured to detect when an operation on a block makes the block inactive in at least one volume, and determine if the block is active in any volume, the block being cached within a first segment in the second memory, where whenever an operation on a block is detected that makes the block inactive in at least one volume, the processor determines if the block is active in any volume, the block being cached within a first segment in the second memory. When the block is not active in any volume, the processor sets the block status of the block as inactive, and whenever the processor detects that the first segment is being evicted from the second memory, the processor re-caches the block into a second segment in the second memory if the block status of the block is active and a frequency of access to the block is above a predetermined value.

A non-transitory computer-readable storage medium storing a computer program includes program instructions for maintaining, in a first memory of a storage system, a block status for each of a plurality of blocks, the block status identifying if the corresponding block is active in any volume of the storage system, each block being associated with one or more volumes and each block being stored within one segment of a plurality of segments, where the plurality of segments is configured to be cacheable in a second memory that is a read cache memory. The storage medium also includes program instructions for, whenever an operation on a block is detected that makes the block inactive in at least one volume, determining if the block is active in any volume, the block being cached within a first segment in the second memory. The storage medium also includes program instructions for, when the block is not active in any volume, setting the block status of the block as inactive, and program instructions for detecting that the first segment is being evicted from the second memory. The storage medium also includes program instructions for re-caching, in response to the eviction of the first segment, the block into a second segment in the second memory when the block status of the block is active and a frequency of access to the block is above a predetermined value.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for evicting or copying-forward blocks in a network storage device during garbage collection, depending on whether the blocks are active or inactive. During operation of the system, the heat temperature of memory blocks increases or decreases based on their use over time. When a block in cache is rewritten or deleted, the heat temperature for the block is lowered below a threshold temperature. This ensures that the block is evicted and garbage-collected from the cache faster. Active blocks are copied forward during garbage collection if their temperature is above the threshold temperature. Copying forward the active blocks, while discarding the inactive blocks, improves cache utilization and performance.

In one method, a block status is maintained in a first memory to identify if the block is active or inactive, blocks being stored in segments that are configured to be cacheable in a second memory, a read-cache memory. Whenever an operation on a block is detected making the block inactive in one volume, the system determines if the block is still active in any volume, the block being cached in a first segment in the second memory. When the system detects that the first segment is being evicted from the second memory, the system re-caches the block into a second segment in the second memory if the block status of the block is active and the frequency of access to the block is above a predetermined value.

In some embodiments, a heat map is maintained for blocks of data stored in the cache memory. The heat memory keeps track of the "temperature" of each of the blocks, where the temperature measures how frequently the block is being accessed. Based on the temperature, a group of blocks, referred to herein as a segment, is evicted from the flash cache, but some of the blocks of the segment may be kept in the flash cache by being rewritten into the cache memory in anew segment. This eviction method is referred to herein as Access-Based Eviction (ABE), and rewriting blocks into cache is referred to herein as copying forward these blocks.

In some implementations, a first-in first-out (FIFO) scheme is used for evicting segments from cache memory, but in the FIFO scheme, good blocks are "thrown away" together with blocks that are not being accessed.

Cache pinning of volumes is the ability to always keep the active blocks of a volume in the cache. The heat map together with the copying forward of blocks provides the ability to pin blocks to the cache, by copying forward these blocks when the segment they reside in is evicted from cache memory.

It will be apparent, that the present embodiments may be practiced without some or all of these specific details. In other instances, well-known process operations have not been described in detail in order not to unnecessarily obscure the present embodiments.

Figure 1:
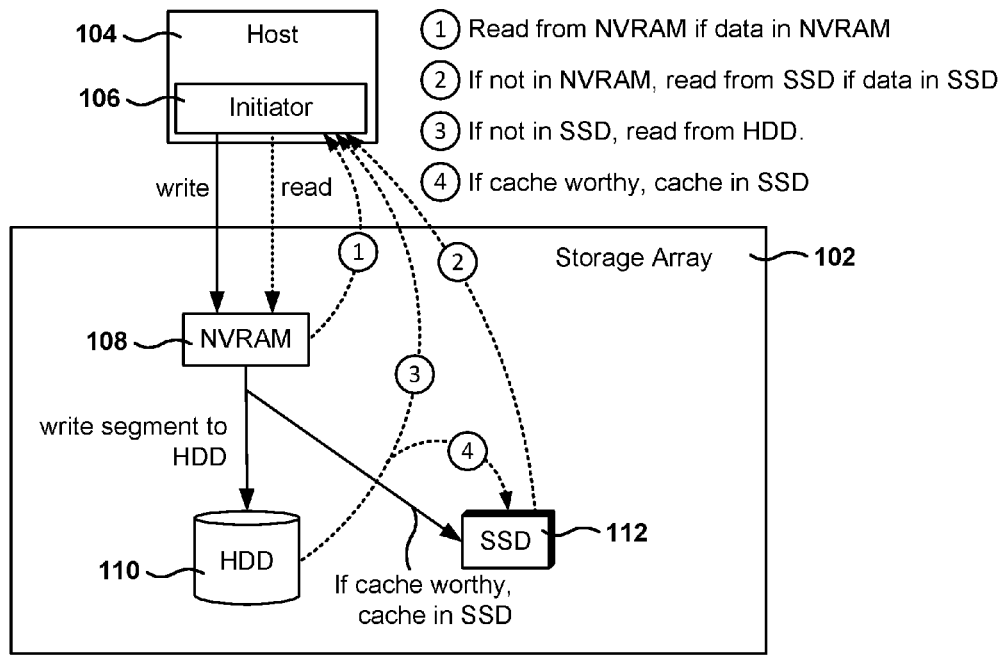
FIG. 1 illustrates the read and write paths within the storage array, according to one embodiment.

FIG. 1 illustrates the read and write paths within the storage array 102, according to one embodiment. The storage array 102 is also referred to herein as a networked storage device or a storage system. In the example architecture of FIG. 1, a storage array 102 provides storage services to one or more servers 104 (which are referred to herein as hosts) and to one or more clients (not shown). Storage array 102 includes non-volatile RAM (NVRAM) 108, one or more hard disk drives (HDD) 110, and one or more solid state drives (SSD) 112, also referred to herein as flash cache.

NVRAM 108 stores the incoming data as the data arrives to the storage array. After the data is processed (e.g., compressed and organized in segments (e.g., coalesced)), the data is transferred from the NVRAM 108 to HDD 110, or to SSD 112, or to both.

The host 104 includes one or more applications and a computer program named initiator 106 that provides an interface for accessing storage array 102 to the applications running in host 104. When an IO operation is requested by one of the applications, initiator 106 establishes a connection with storage array 102 in one of the supported formats (e.g., iSCSI, Fibre Channel, or any other protocol).

Regarding the write path, the initiator 106 in the host 104 sends the write request to the storage array 102. As the write data comes in, the write data is written into NVRAM 108, and an acknowledgment is sent back to the initiator 106 (e.g., the host or application making the request). In one embodiment, storage array 102 supports variable block sizes. Data blocks in the NVRAM 108 are grouped together to form a segment. In one embodiment, the segment is compressed and then written to HDD 110. In another embodiment, the blocks are compressed individually and the segment is not compressed before being sent to HDD 110.

In addition, if the block is considered to be cache-worthy (e.g., important enough be cached or likely to be accessed again) the block is also written to the SSD 112. In one embodiment, the segment stored in disk has the same size as the segment stored in cache, but in other embodiments, the segments have different sizes.

With regards to the read path, the initiator 106 sends a read request to storage array 102. The requested data may be found in any of the different levels of storage mediums of the storage array 102. First, a check is made to see if the data is found in the NVRAM 108, and if the data is found in the NVRAM 108 then the data is read from the NVRAM 108 and sent back to the initiator 106. In one embodiment, a shadow RAM memory (not shown) (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the NVRAM 108 (or the shadow RAM) then a check is made to determine if the data is in SSD 112, and if so (i.e., a cache hit), the data is read from the SSD 112 and sent to the initiator 106. If the data is not found in the NVRAM 108 or in the SSD 112, then the data is read from the hard drives 110 and sent to initiator 106. In addition, if the data being served from hard disk 110 is cache worthy, then the data is also cached in the SSD 112.

Figure 2:
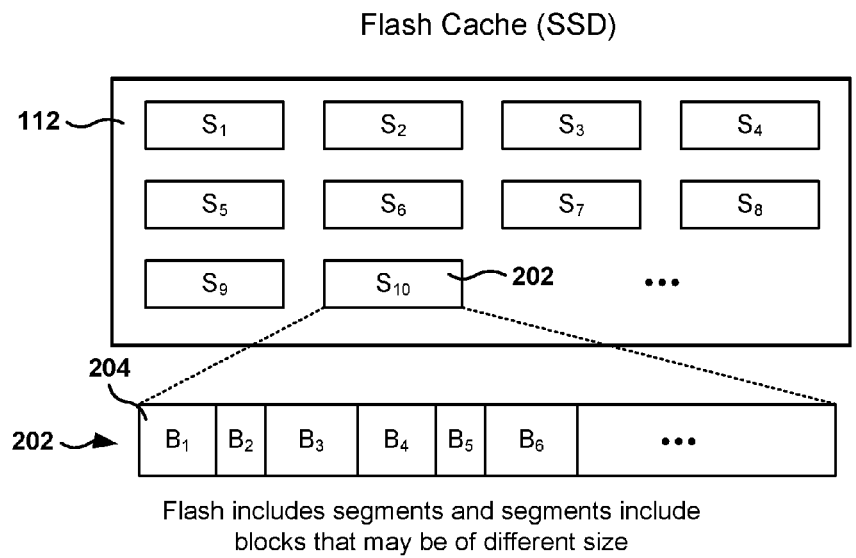
FIG. 2 illustrates the structure of a flash cache using a solid state drive (SSD), according to one embodiment.

FIG. 2 illustrates the structure of a flash cache using a solid state drive (SSD), according to one embodiment. In one embodiment, segments 202 are stored in the flash cache 112, where the segments have equal size. In other embodiments, the segments may have different sizes. In some embodiments, the segments may be 32 MB or 64 MB, although other values are also possible, such as 60 MB, 128 MB, 256 MB, etc. In one embodiment, the size of the flash cache may be 1 TB, although other values are also possible (e.g., in the range of 250 GB to 10 TB or more).

The segments (e.g., segment 202) include a plurality of blocks $B_i$ that may be of equal or different size. That is, a segment may have blocks of different sizes, although in some cases a segment may have blocks that all have the same size. Because of this, not all segments have necessarily the same amount of blocks. In some embodiments, the blocks may be within the range of 256 bytes to 32 kB, although other values are also possible.

In one embodiment, when writing to the flash cache 112, one segment is written at a time. An individual block may not be written in a single write operation. For example, it is not possible to overwrite in a write operation a block already stored within the flash cache. In order to overwrite a block, a whole new segment has to be written, the new segment having the new block.

Further, in one embodiment, the flash cache is a read-cache memory but the flash cache is not a write-cache memory. As described above with reference to FIG. 1, the flash cache is not a write cache because when data is stored in the storage array 102, the incoming data is not cached in the flash cache 112 without the data being written to disk 110. This means that all the data in the flash cache is stored in hard drives 110, so when a segment is evicted from the flash cache, it is not necessary to worry about preserving the data stored in the flash cache, because the data is guaranteed to be stored on disk.

Figure 3A:
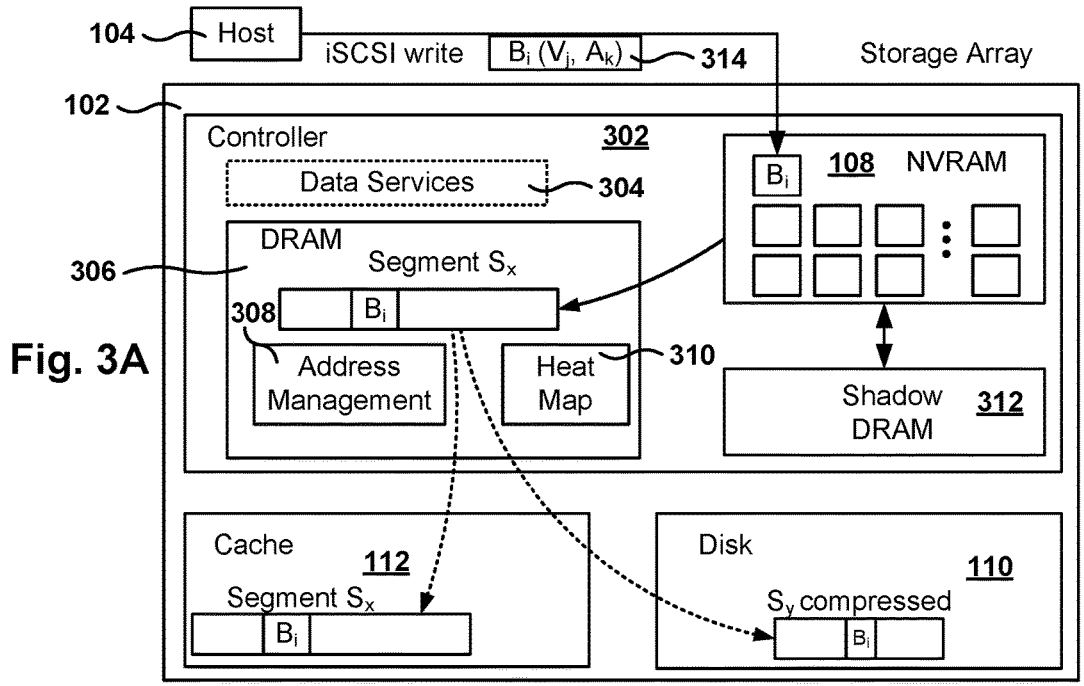
FIG. 3A illustrates the processing of a write request, according to one embodiment.

FIG. 3A illustrates the processing of a write request, according to one embodiment. In one embodiment, the host sends a write command 314 (e.g., an iSCSI write command) to write a block $B_i$ into the storage array 102. In one embodiment, the data within the storage array 102 is organized in volumes e.g., a drive), where each volume is a single accessible storage area. The write request for block $B_i$ includes a volume identifier $V_j$ and an offset $A_k$ within the volume.

As discussed above, volume $B_i$ is initially stored in NVRAM 108. The block is then added to a segment $S_x$ in DRAM 306, and the segment $S_x$ is transferred to disk 110 and optionally to flash cache 112. In one embodiment, the segment is compressed before being sent to disk 110. In one embodiment, a shadow DRAM 312 keeps the same data as NVRAM 108, and shadow DRAM 312 is used to serve read requests.

DRAM memory 306 keeps data used for management of the storage array 102. In one embodiment, an address management area 308 is used for keeping track of the addresses of a block that may be stored in NVRAM 108, in flash cache 112, and in disk 110. Additionally, in one embodiment, a heat map 310 is kept in DRAM 306 to store data for keeping track of the frequency of access to blocks in the flash cache 112. In one embodiment, the frequency of access for each block is tracked in the heat map by a value named the block temperature. The block temperature is a number that increases each time the respective block is accessed. Additionally, the block temperature is lowered periodically, such as for example by a garbage collection program or an eviction program that periodically lowers the temperature for all blocks.

If block $B_i$ is cached in flash cache 112, the block temperature for $B_i$ is initialized in heat map 310. Further, as discussed in more detail below, a garbage collection (GC) process for the cache memory uses the heat map data to identify which segment will be evicted from cache and which blocks from the segment being evicted will be kept in cache memory. The temperature of the block is an indication on how important the block is (e.g., how often the block is accessed), and by using the temperature of the block it is possible to remove from cache the blocks that are not important, while keeping the important blocks in cache for longer periods.

Figure 3B:
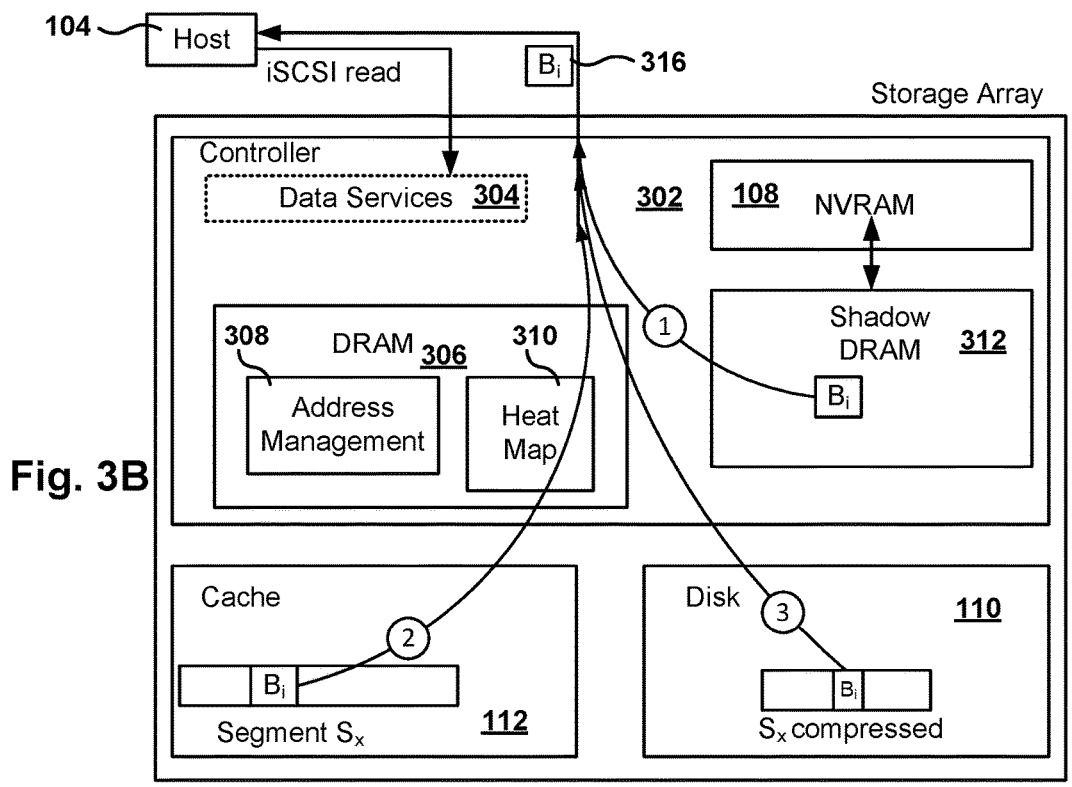
FIG. 3B illustrates the processing of a read request, according to one embodiment.

FIG. 3B illustrates the processing of a read request, according to one embodiment. As discussed above with reference to FIG. 1, when a read request for block $B_i$ is received 316, the storage array checks to see whether the data is in NVRAM 108, DRAM 306, flash cache 112, or disk 110. Then the data is served from the faster media where the data for block $B_i$ is available.

If the block $B_i$ is served from flash cache 112, then the heat map 310 for block $B_i$ is updated to reflect the new access to block. In one embodiment, the block temperature for block $B_i$ is increased by 1. In other embodiments, other changes to the block temperature may be utilized to reflect the new access. In another embodiment, if the block $B_i$ is in NVRAM 108, the heat map 310 for block $B_i$ is also updated to reflect the new access to block.

In one embodiment, the block temperature is a four-bit integer, but other embodiments may utilize more or less hits to a store the block temperature. In this case, the block temperature has a value between 0 and 15. When a block is first written to cache, the block temperature is initialized to a predetermined value, such as 0, or 1, or 3, etc. Then, as the block is accessed, the block temperature is increased, up to the maximum of 15. As discussed above, the temperature may be lowered periodically to allow blocks not being accessed any more to "cool" down and become candidates for eviction.

Figure 4:
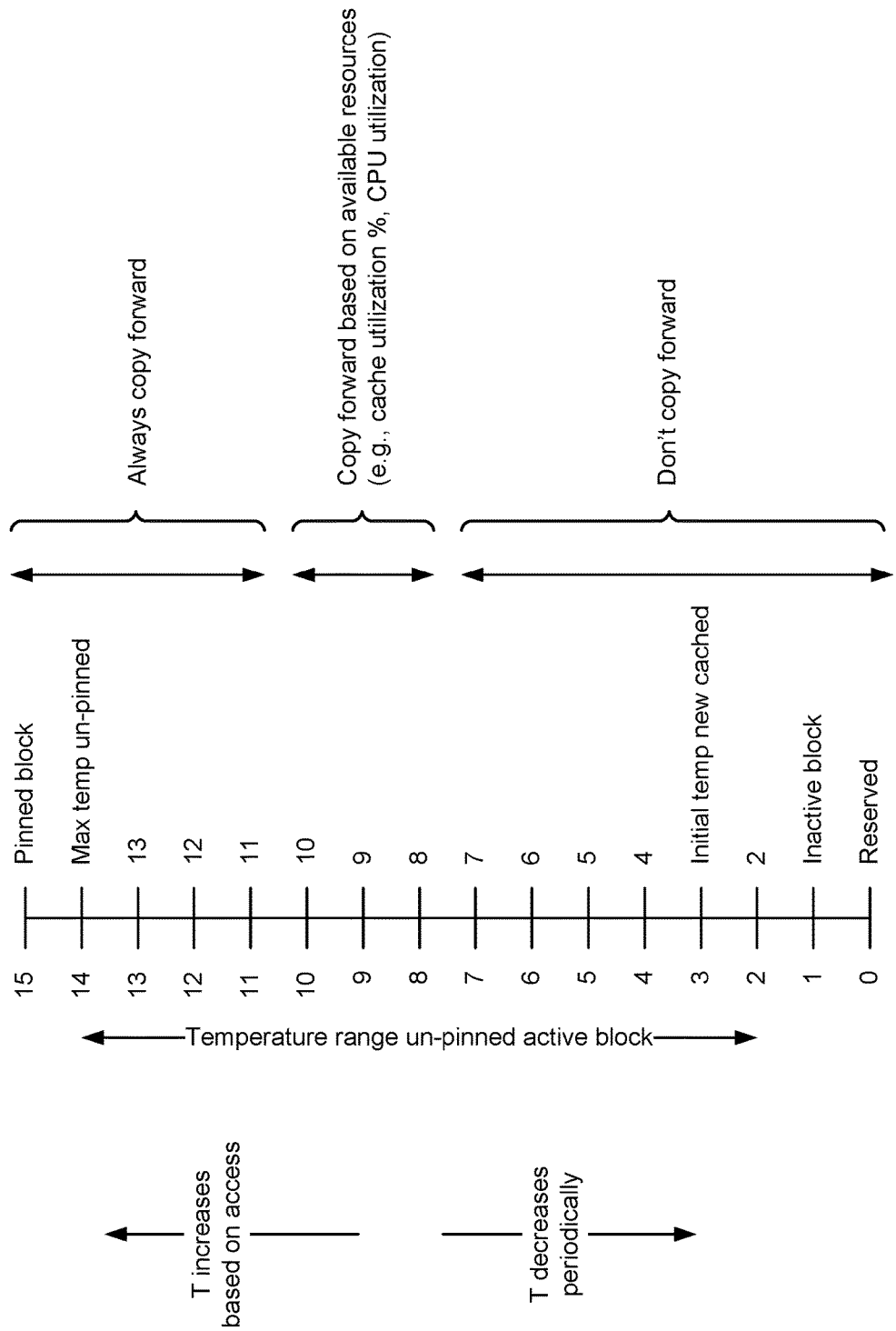
FIG. 4 illustrates a temperature map for managing block operations, according to one embodiment.

FIG. 4 illustrates a temperature map for managing block operations, according to one embodiment. The temperature of the block is used to determine what actions the system takes when doing garbage collection, in particularly when the segment where a block resides is being evicted from the cache memory.

Over time, the temperature of the blocks may change based on system and block-related activities. For example, the temperature of the block increases based on the frequency of access to the block over time. For example, the block increases the temperature every time the block is accessed, and the temperature of the block decreases when the block is not being accessed. For example, the system periodically lowers the temperature of all blocks in order to "cool off" the blocks. Those blocks that are being accessed will remain "hot" because the temperature increases with access, although it may be periodically lowered. On the other hand, those blocks that are not being accessed will continue to have their temperature decreased, until the temperature reaches a minimum temperature.

In the embodiment of FIG. 4, the minimum temperature for active blocks is 2, because a temperature of 1 is reserved for inactive blocks. For example, inactive blocks are given a temperature of 1 (as shown in FIG. 4), while a temperature of 0 is reserved for other purposes. In another embodiment, an inactive block may be given a temperature of 0, which will guarantee that the block is not kept in cache when the segment where the block resides is evicted.

In one embodiment, the temperature assigned to inactive blocks may have another reserved value, as long as that value is not used by active blocks. For example, the inactive blocks may be given a temperature of 0, and their temperature is never changed after the block becomes inactive. This way, the inactive blocks will be evicted from cache during garbage collection.

in another embodiment, a predetermined value may be assigned to blocks pinned to cache (e.g., 15). In some embodiments, the storage array administrator has an option to determine that the volume is to be pinned in cache, which means that all the blocks from the volume will be kept in cache. Further, the administrator may also reserve an amount of cache space for a volume. When a block is pinned to cache, the block is given a high temperature (e.g., 15) so the block is always kept in cache. Additionally, a pinned block may not be cooled off over time because there would be a risk that the pinned block would be evicted. In other embodiments, pinned blocks are tracked with a different parameter (e.g., a bit on the heat map) so these pinned blocks are not evicted during garbage collection.

In one embodiment, blocks with the temperature above a predetermined threshold (e.g., 7), will always be copied forward during garbage collection. In another embodiment, "hot" blocks will always be copied forward if they are above a first threshold temperature (e.g., 10). Further, blocks whose temperature is below the first threshold and above a second threshold (e.g., 7), will be copied forward based on the resources available in the system. For example, if cache utilization is very high and it is desired that garbage collection frees as much space as possible, then blocks with temperatures between 8 and 10 will not be copied forward. However, during other periods were cache utilization is lower, blocks with temperatures between 8 and 10 will be copied forward. Blocks below the second threshold (e.g., 7) will not be copied forward.

In one embodiment, the block temperature has the following values:

15—the block is pinned.

11-14—the block is "very hot," which means that the block is an active block of a non-pinned volume; the block will always be copied forward during garbage collection.

8-10—the block is "hot," which means that the block is an active block of a non-pinned volume; the block will be copied forward during garbage collection if resources are available.

0-7—the block is "cold" and the block will be evicted from cache during garbage collection.

It is noted that a predetermined value is reserved as the initial temperature for new blocks in cache (e.g., 3, but other initial values are also possible). It is noted that the embodiment illustrated in FIG. 4 is exemplary. Other embodiments may utilize different temperature ranges (e.g., 0-10, 0-100, −10-10, etc.), define different band-categories for actions to be taken on the blocks during garbage collection, increase or decrease the temperature according to other frequency of use criteria, etc. The embodiments illustrated in Figure and 4 should therefore not be interpreted to be exclusive or limiting, but rather exemplary or illustrative.

In one embodiment, the storage device includes an index, in the form of a tree map associated with a volume $V_1$, for indexing the blocks within the volume. The storage array keeps track of the locations of blocks for all volumes in the storage array. Different methods may be used to index the different blocks, such as a heap, a tree, a vector, etc. In one embodiment, the index is a tree structure for identifying the location of the blocks. There is a root node at the top of the volume, intermediate nodes with pointers to other intermediate nodes or to blocks, and blocks of the bottom of the tree structure. As used herein, this structure is referred to as the cache index, but the cache index may use any other type of data organization.

A volume $V_1$ is an active volume when its blocks may be read, may be rewritten, and may be erased, and new blocks may be added. When a user requests data from the active volume $V_1$, the read request will serve one or more of the active blocks from volume $V_1$. Over time, the data administrator may configure the storage array to take snapshots of volume $V_1$ (e.g., periodically or upon command). When a snapshot $S_1$ of volume is created a new data structure is created for the snapshot. In one embodiment, the blocks are not copied and the index for the snapshot utilizes A or part of the index for the volume $V_1$. In general, snapshots are read only, although in some cases small amounts of data may be written in the snapshot for some embodiments.

As used herein, the index that contains the active blocks of the volume is referred to as the tip of the volume, or tip of the drive. Additionally, blocks that cannot be accessed from a host are referred to as dead blocks. Further, the blocks that are accessible from a host are live blocks. The live blocks can be snapshot-only blocks or active blocks. The snapshot-only blocks are blocks that can be accessed only in a snapshot but not within an active volume. Active blocks are those blocks that can be accessed in the active state of a volume, i.e., the tip of the volume. As used herein an inactive block is a block that is not an active block. It is noted that an active block can belong to one or more volumes.

It is it is important to only keep the active data in order to increase the effectiveness of the cache to keep important data, as the cache is a limited resource. Embodiments presented herein provide the ability to identify which are the active blocks effectively across many volumes, and provide the ability to evict the inactive blocks out of cache efficiently.

Further yet, active blocks can be cold, hot, or pinned. Cold blocks are those that are not accessed frequently, hot blocks are those that are accessed frequently, and pinned blocks are those blocks that belong to a volume designated by the user as a pinned volume.

In one embodiment, when a block from flash cache is overwritten, the temperature of the block is immediately lowered so the block will be evicted when the segment is evicted from memory. In other words, the block will not be copied forward, i.e., the block will not be added to another segment for being rewritten to the cache. In one embodiment, the temperature for the overwritten block is set to 0, but other values are also possible. A clone $V_2$ is a volume created as a copy of an active volume. In one embodiment, the clone shares historic snapshot data with the parent volume.

In general, blocks may be inactivated in three ways. First, when new blocks overwrite all blocks, the overwritten blocks become inactive. This is the most common cause of block inactivations. Second, during block migrations in the storage system, blocks, or groups of blocks, are sometimes transferred from one storage array to another storage array. After the blocks are migrated, the blocks at the source need to be deleted. Third, during a volume restore or a snapshot rollback. This operation changes the tip of the volume from the current state to a snapshot. Since the tip changes, the list of active blocks that represent the volume also changes and the heat map needs to be updated.

In one embodiment, in order to have an efficient cache, the blocks that are still active should remain in the cache, and the inactive blocks should he discarded. When blocks are marked dead or inactive, the blocks are not removed from cache right away, because it is an expensive operation to remove a block from cache. Instead, the dead or inactive blocks are removed from the flash cache when it is convenient or necessary, such as when a segment is being evicted from cache.

Figure 5A:
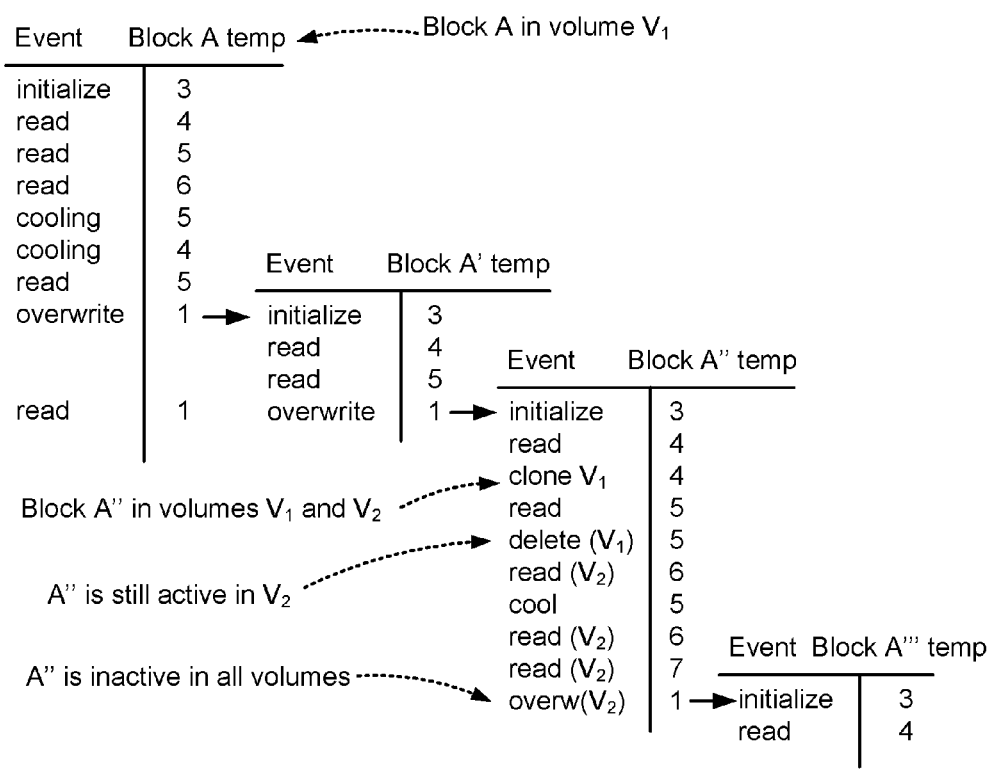
FIG. 5A illustrates the evolution of the temperature of a block over time based on events, according to one embodiment.

FIG. 5A illustrates the evolution of the temperature of a block over time based on events, according to one embodiment. A block is evicted when the block is raised from cache memory during garbage collection. The blocks are garbage-collected faster once they become inactive, because the segments that have active blocks are chosen faster for garbage collection.

As discussed earlier, in one embodiment, the temperature of the block increases when a block is accessed and the temperature decreases periodically. In one embodiment, a process executes periodically that decreases the temperature of all blocks whose temperature is greater than 1.

Additionally, the temperature of a block may be reset to a predetermined value (e.g., 1 although other values are also possible), associated with very low heat, when the block is inactivated. By setting the temperature to 1, there is an opportunity for backup software to access this block before it is completely eliminated from cache. Similarly, when inactivating a block from a non-pinned volume, its temperature is also set to 1 (very low heat), for the same reason.

In the exemplary illustration of FIG. 5A, the temperature of a block A is tracked over time. When the block is first written into cache, the temperature is initialized to a predetermined value e.g., 3, although other values are also possible). Afterwards, the block is read three times, and each time the temperature of the block is increased. Afterwards, there is a period of inactivity and the block is cooled off (i.e., the temperature is decreased) two times. Then the block is accessed once again and the temperature is increased to a value of 5.

Afterwards, block A is overwritten by block A'. The temperature of block A is reset to 1 because the block is no longer active. The temperature of block A' is initialized and then the temperature is increased two times after the block A' is accessed twice. Afterwards, block A' is overwritten by block A". The temperature of block A' is set to 1 and the temperature of block A" is initialized to 3.

The temperature of A" is increased when the block is accessed and then a clone $V_2$ of volume $V_1$ is created. Therefore, block A" is now active in volumes $V_1$ and $V_2$. Later, when block A" is deleted in volume $V_1$, the temperature is not reset because A" is still active in volume $V_2$.

Then the temperature of A" continues to increase or decrease based on access or cooling periods until A" is overwritten in volume $V_2$ by A'''. Since A" is now inactive in all volumes, the temperature of A" is reset to 1.

Figure 5B:
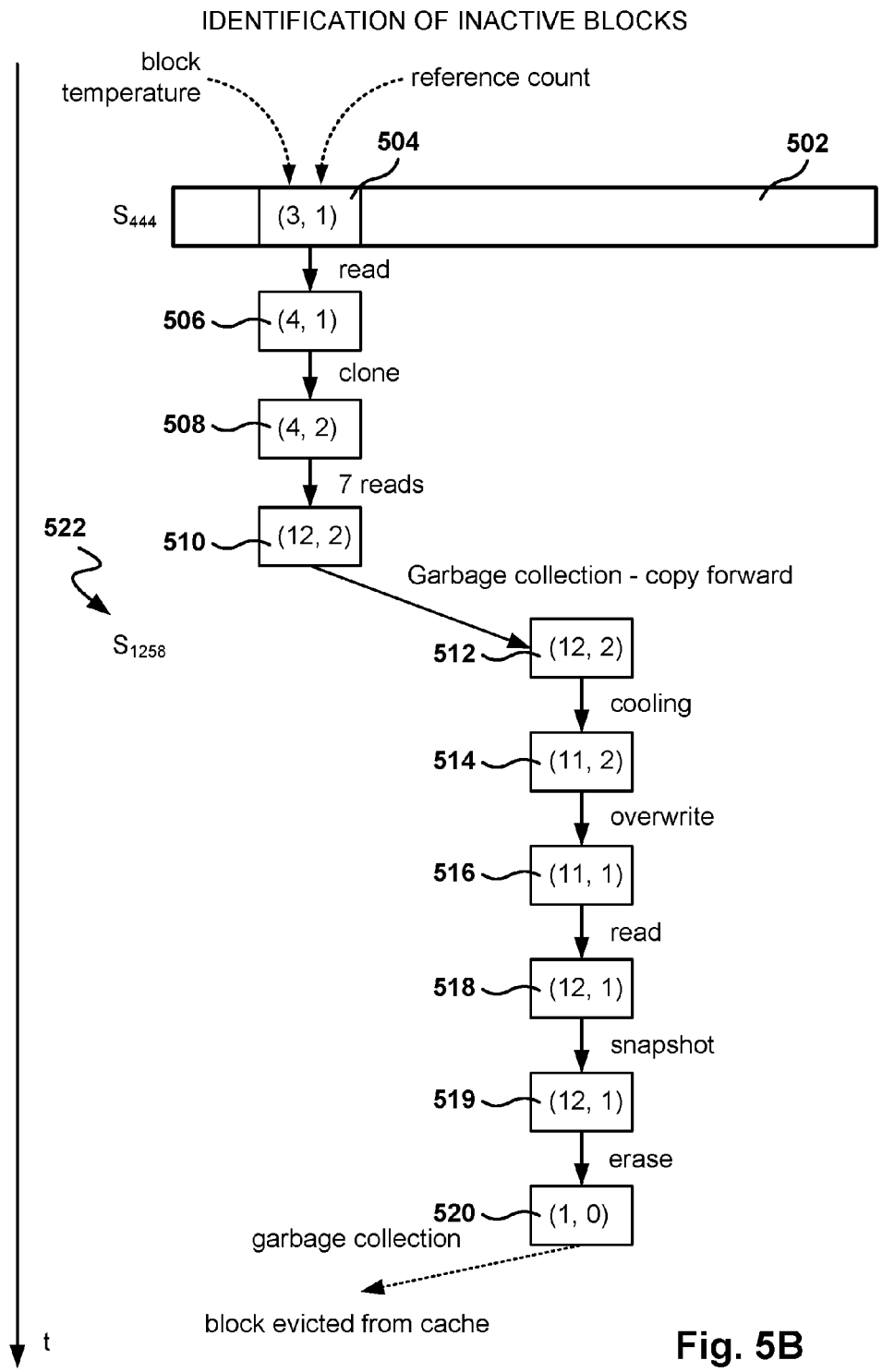
FIG. 5B illustrates the identification of inactive blocks during garbage collection, according to one embodiment.

FIG. 5B illustrates the identification of inactive blocks during garbage collection, according to one embodiment. FIG. 5B illustrates the changes in temperature of block 504 belonging to segment $S_{444}$ 502. Two values are associated with block 404, enclosed within parentheses, (the temperature of the block, the reference count). The reference count, also referred to herein as the &duplication counter, indicates how many volumes have block 504 as an active block. For example, if a block exists in three different volumes, and the deduplication system in the storage device has identified the multiple copies of the block, the block may be stored once and the reference count indicates how many volumes are referring to the block.

Initially, block 504 is written. The initial temperature of the block is set to a predetermined value (e.g., 3), and the reference count is set to 1. After block 504 is read one time, the temperature is increased by 1, and the block 506 has values (4, 1).

The volume where the block resides is then cloned, and the reference count is increased by one, thus, block 510 has values (4, 2), where the number 2 indicates that two different volumes have block 508 as active. The block is then read 7 times and the temperature is increased 7 times, therefore block 510 has values (12, 2) after the 7 reads.

Later, garbage collection evicts segment $S_{444}$ from cache, and during garbage collection, the system determines that block 510 is to be copied forward because the temperature of the block is about the threshold temperature for copying forward blocks. The block is then rewritten into segment $S_{1256}$ 522, with block 512 still retaining the associated pair of values (12, 2). Afterwards, the cooling process makes the temperature of the block to decrease by 1, therefore block 514 has values (11, 2).

Block 514 is then overwritten in the original volume where the block was created, therefore, the reference count is decreased. In one embodiment, the temperature of the block is also decreased when a block is overwritten, but in other embodiments, the temperature of the block is not changed when the block is overwritten. Block 516 has now values (11, 1). Afterwards, block 516 is read, which causes an increase in temperature, thus, block 518 has now values (12, 1).

A snapshot of the block is created, and the snapshot does not change the block temperature or the reference count, therefore block 519 has values (12, 1). Block 518 is then erased from the clone, which makes the block inactive, because the block is no longer active in any of the volumes associated with that block. Since the block is now inactive, the temperature is immediately lowered to 1. Thus, block 520 has now values (1, 0), where the 1 indicates that the block is inactive, and the number 0 also indicates that the block is inactive because no volumes have the block as current data.

It is noted that the pair of values (temperature, reference count) may be kept in different memories and may be accessed in different ways. For example, the reference count may be stored within a data structure used for deduplication, while the temperature is kept in the data structure associated with the segment. By having the temperature of the block indicate that the block is in active, it simplifies the garbage collection process because it is not necessary to access the data associated with deduplication, only the data associated with a segment that is being evicted from cache.

The temperature of block 520 will remain at 1, because no active volume is accessing the block. In one embodiment, if the block is accessed because the user is accessing a snapshot that includes that block, the temperature of the block doesn't change due to the snapshot access. In yet another embodiment, access to any block having a temperature of 1 will not change the temperature of that block, unless, that block becomes once again active (e.g., a clone is created from a snapshot that includes the block).

When segment $S_{1258}$ is evicted from cache because of a second garbage collection process, block 520 will be evicted from cache because the temperature of the block is below the threshold temperature for copying forward the block. There are several reasons why a block may become inactive, such as by erasing the block, overwriting the block, or deleting the volume that holds that block, etc.

By eliminating inactive blocks from cache faster, the cache becomes more efficient (e.g., the cache hit ratio goes up) because there are more active blocks in cache, and active blocks have a higher probability of being read than inactive blocks.

Figure 6:
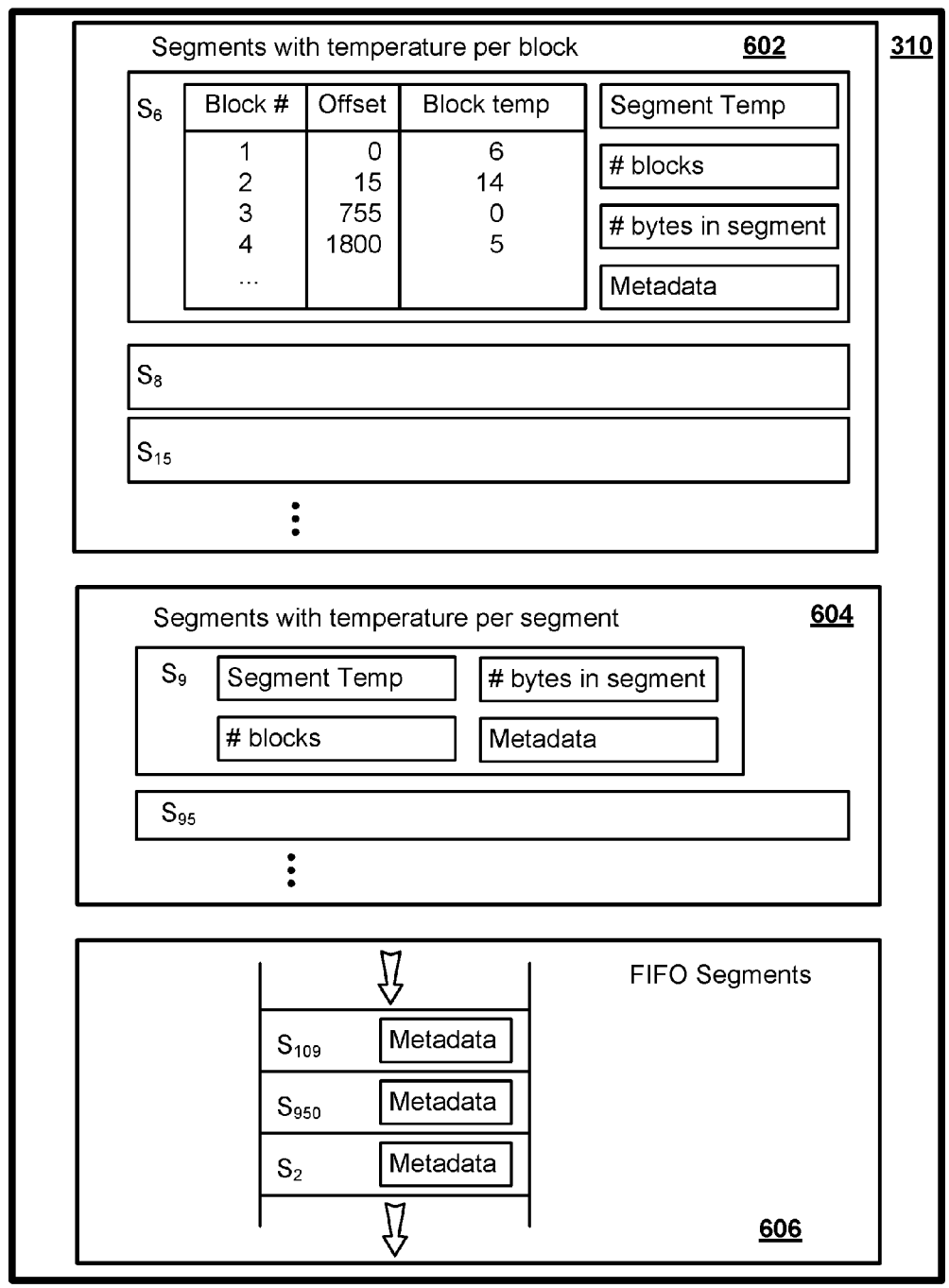
FIG. 6 illustrates the structure of a heat map stored in RAM for tracking the temperature of blocks and segments within a cache memory, according to one embodiment.

FIG. 6 illustrates the structure of a heat map stored in memory for tracking the temperature of blocks and segments within a cache memory, according to one embodiment. The heat map is also referred to herein as a segment activity table. In one embodiment, the heat map is used to store information about the frequency of access to blocks in the cache.

The information in the heat map is used by the garbage collection (GC) process to find segments for eviction from cache, and to copy forward blocks to the cache. In one embodiment, the heat map is stored in RAM memory for quick access and is sporadically flushed to disk for persistence.

In one embodiment, there are three ways of tracking segments in cache. A first group of segments 602 are tracked by keeping the temperature for each of the blocks in the segment. A second group of segments 604 are tracked by keeping a segment temperature value for each segment, without keeping track of the block temperatures. Finally, a third group of segments 606 do not use temperature information and use a FIFO method for evicting segments from cache.

Regarding segments with temperature per block 602, a table provides information about each block in the segment, including the block ordinal number, the offset of the block within the segment, and the block temperature. Additionally, other data kept for each segment includes the segment temperature, the number of blocks in the segment, the number of bytes written in the segment, and segment metadata having additional segment-related information, such as the segment identifier, version identifier, etc. In one embodiment, these parameters are kept in one data structure, but in other embodiments, the parameters may be stored in separate data structures (e.g., the segment temperature is kept in a different table than the segment temperature).

In one embodiment, the block temperature is kept in a four-bit variable, as discussed above, but more or less storage may be used to track block temperature. In one embodiment, the number of blocks in the segment is variable because the blocks may have different sizes. In addition, the number of blocks may also vary due to compression of the blocks before being stored. In one embodiment, a variable-size record is kept per segment to accommodate the variability in the number of blocks.

The ordinal number, also referred to herein as the block number, is a number assigned to each block that identifies the position of the block within the segment. For example, the block numbers may be 1 3, 4, etc.

In one embodiment, a block is identified in memory by pair of values: the segment ID, and the offset of the block within the segment. When a read request comes with this pair of values, the system reads the corresponding segment, starting at the provided offset. However, it is not possible from the offset to identify the ordinal number of the block within the segment, because blocks have variable sizes. Since the block number is not known, it would not be possible to update the block temperature. In order to avoid this problem, an offset value is kept per block in the DRAM memory, no when a request for a block comes in, it is possible to quickly identify the block number from the offset of the block, and operations on the block temperature are possible and fast.

The segment temperature is also referred to as the segment utilization. In one embodiment, the temperature of the segment is calculated according to the following equation:

$$\text{segment temperature} = (\#\text{blocks with } T_i > K) \times \#\text{bytes written to segment} / \#\text{blocks in segment} \qquad (1)$$

Where #blocks is the number of blocks, #bytes is the number of bytes, $T_i$ is the temperature of block i, and K is a threshold temperature value (e.g., in the range of 4-10, although other values are also possible).

For example, if there is a segment with 10 blocks with an equal size of 4 kB, one block has a temperature above the threshold temperature K, and 9 blocks have a temperature below K, then the segment temperature will be equal to (1 block with Ti>K)×(40K bytes written to segment/10 blocks in segment)=4 KB.

Once a volume is marked as pinned by the storage administrator, there are two possible approaches to populate the data of the volume into the cache: proactive scan and caching on-the-fly. In the proactive scan, the system scans the volume for active blocks and the blocks that are not already cached are then cached. In addition, in one embodiment, these blocks are marked as pinned in the heat map.

In the caching on-the-fly method, the blocks are cached when the volume receives new writes or when there is a cache miss on a block read. Therefore, all writes to the volume after the volume is marked as pinned will be cached and pinned. Even though initially not all the blocks are cached, eventually all the blocks of the volume will be cached.

In some extreme cases, it is possible that there is not enough space in DRAM to keep the block temperature for each block, which may be happen when a large number of blocks are in cache due to compression or due to the existence of many small blocks. In these cases, it is possible to keep segments with a segment temperature value per segment 604 instead, without keeping track of the individual block temperatures.

In one embodiment, the segment temperature, for segments without a block temperature, is equal to the number of active bytes in the segment. When garbage collection is performed, the segment temperature will be used to determine if the segment is evicted or not, but copying forward of blocks will not be available for these segments because there is no block temperature available. This segment temperature is valuable because the segment that will be chosen will have the least amount of active bytes. It is an objective of garbage collection to evict segments with the least amount of active bytes in order to "clean" as many inactive bytes as possible from the cache in each eviction.

There can be times when temperature information is not available. For example, if the system just rebooted. At that point, it is possible to use a FIFO method for cache eviction, which is based on the age of the segments in the cache. In this case, the segment that has been the longest time in the cache will be evicted first.

In addition, there could be situations where FIFO may be more efficient for certain volumes, and then it is possible to utilize FIFO for those volumes while using heat for the other volumes. This means that the system supports segments with different types of heat maps.

For the purpose of garbage collection, the FIFO segments are assigned a temperature of zero, so FIFO segments will be evicted first, and as long as there are FIFO segments, the segments with a temperature greater than zero will remain in cache.

In one embodiment, the storage array provides an option to system administrators for selecting which type of segment eviction method to use for a given volume: using block temperatures, using a segment temperature, or using FIFO.

It is noted that the embodiments illustrated in FIG. 6 are exemplary. Other embodiments may utilize different data values, organize the data in a different form, include additional values, or omit some of the values. The embodiments illustrated in FIG. 6 should therefore not be interpreted to be exclusive or limiting, but rather exemplary or illustrative.

Figure 7:
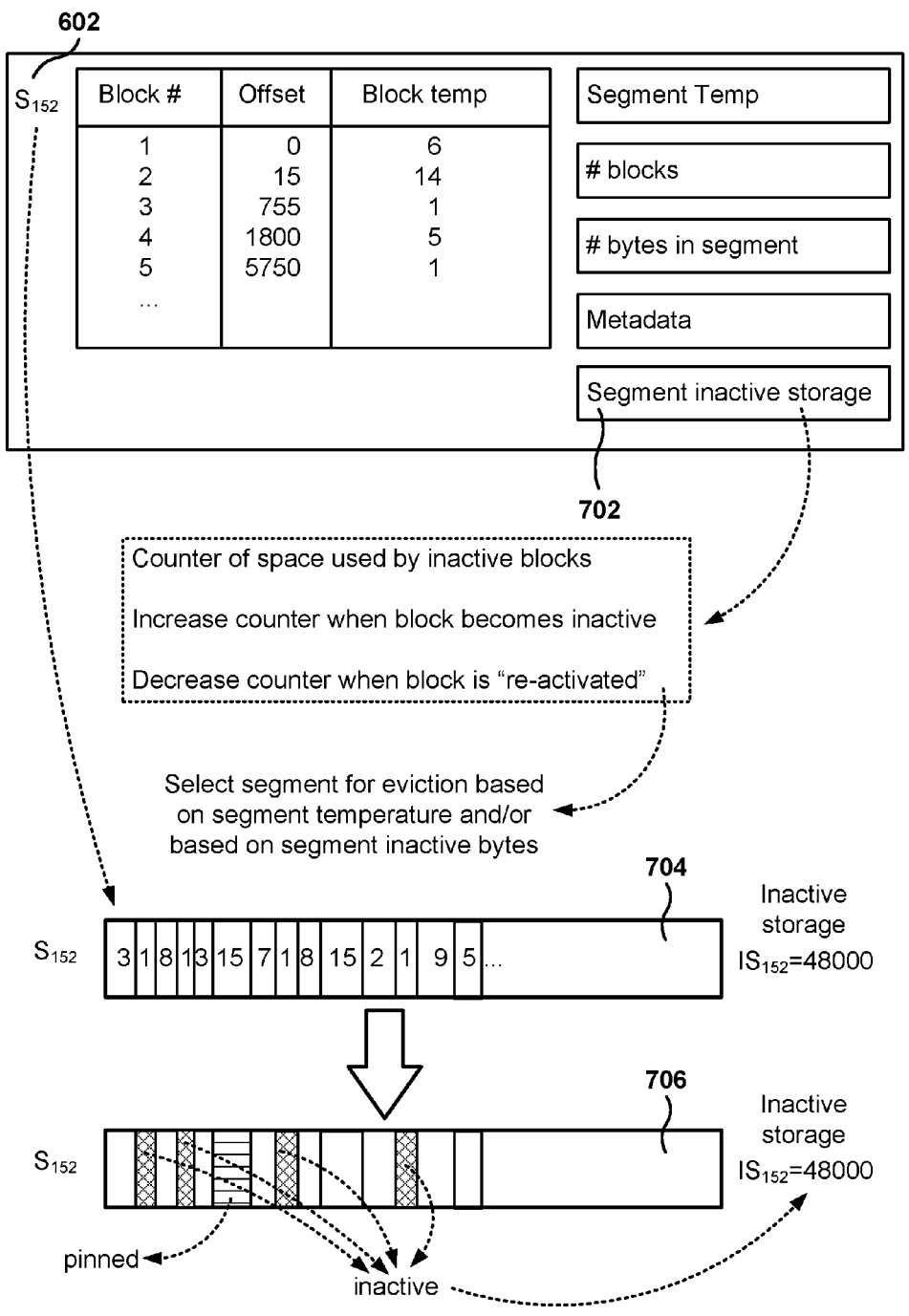
FIG. 7 illustrates the identification of inactive blocks within a segment, according to one embodiment.

FIG. 7 illustrates the identification of inactive blocks within a segment, according to one embodiment. In one embodiment, the data for segment $S_{152}$ 602 further includes a segment inactive storage counter 702. This segment inactive storage counter stores how many bytes of data is occupied by inactive blocks within the segment. Therefore, every time a block changes the status from active to inactive, the segment inactive storage counter 702 will be increased by the size of the block being inactivated. Also, when that block status changes from inactive to active, then the segment inactive storage counter 702 will be decreased according to the size of the block.

In one embodiment, the cache eviction criteria includes determining which segment has the most amount of inactive space, as indicated by the respective segment inactive storage counter 702. In other embodiments, the eviction criteria based on the segment inactive storage counter is combined with other criteria, such as the segment temperature described above.

In the exemplary embodiment of FIG. 7, segment $S_{152}$ 704 includes a plurality of blocks, and the temperature of each block is shown within segment 704. Initially, segment $S_{152}$ has inactive storage of 48000, corresponding to the total amount of space occupied by inactive blocks within the segment.

The inactive blocks have a temperature of 1, and the pinned blocks have a temperature of 15. Segment $S_{152}$ 706 represents the status of blocks by providing different types of shading. Active blocks are represented without shading, while inactive blocks have a first type of shading and pinned blocks have a second type of shading.

Figure 8:
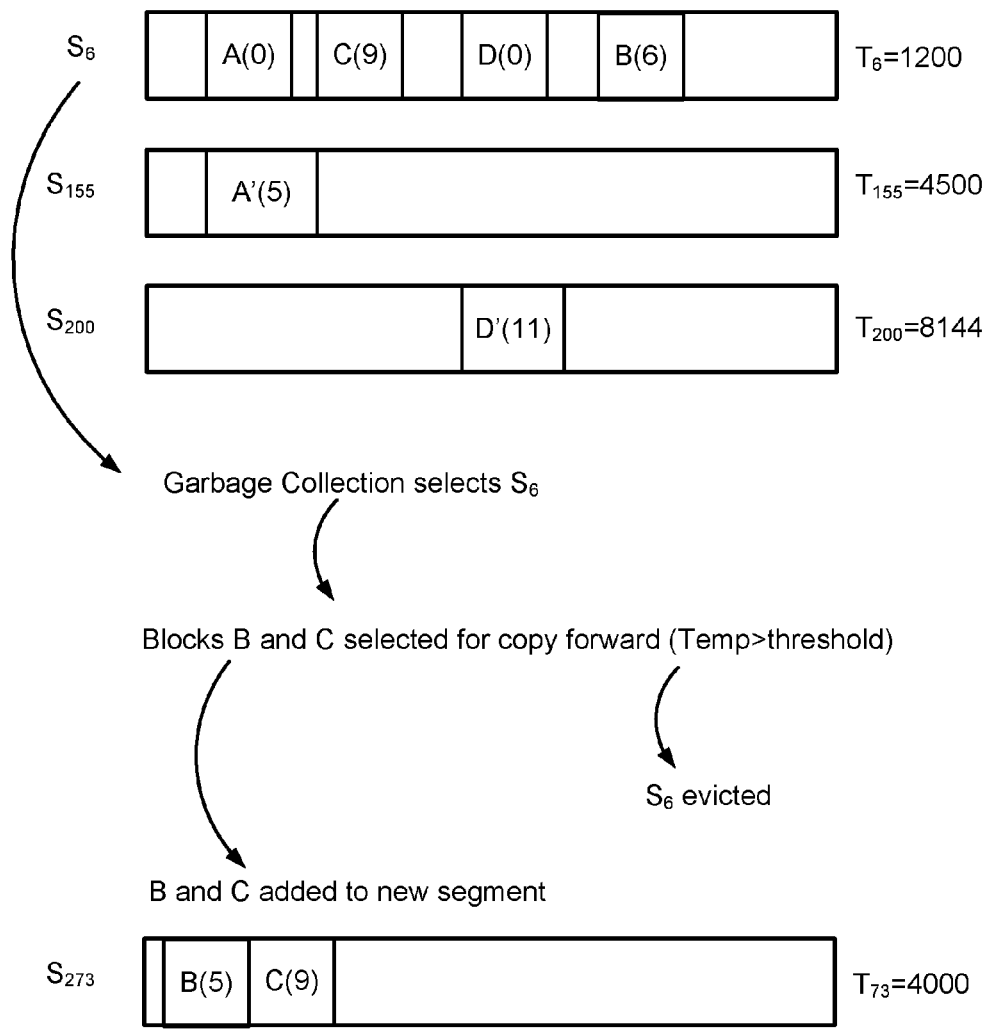
FIG. 8 illustrates the copy forward of blocks in a flash cache during garbage collection, according to one embodiment.

FIG. 8 illustrates the copy forward of blocks in a flash cache during garbage collection, according to one embodiment. It is one goal of garbage collection to pick the segments that have a small amount of data to be copied forward, otherwise GC would have to be run very often.

In one embodiment, garbage collection selects the segment from cache having the lowest temperature. As discussed above, some segments have a temperature that is based on the temperature of blocks within the segments, or the segments have a temperature based on the number of active bytes in the segment, and segments using FIFO for eviction have a temperature of zero.

Once the segment is selected for eviction, if a block temperature is available then the blocks with a temperature above a threshold temperature will be copied forward to cache. Copying forward a block means adding the block to a new segment, together with other blocks that are waiting to be cached, and then caching the new segment.

In the example of FIG. 8, three segments are in cache, $S_6$, $S_{155}$, and $S_{200}$. $S_6$ has a temperature of 1200, $S_{155}$ has a temperature of 4500, and $S_{200}$ has a temperature of 8144. When garbage collection is looking for a segment to evict, $S_6$ is chosen because $S_6$ has the lowest temperature.

$S_6$ has blocks A with a temperature of 0, C with a temperature of 9, D with a temperature of 0, and B with a temperature of 6. In this exemplary embodiment, the threshold temperature is 5, therefore, blocks B and C are selected for copy forward because the temperature is greater than 5.

B and C are added to a new segment $S_{273}$ being formed in RAM and then segment $S_{273}$ is added to the cache. Since blocks B and C are active, the heat temperature for these blocks is maintained at 5 and 9, respectively. In addition, segment $S_6$ is evicted from memory by the garbage collection.

Figure 9A:
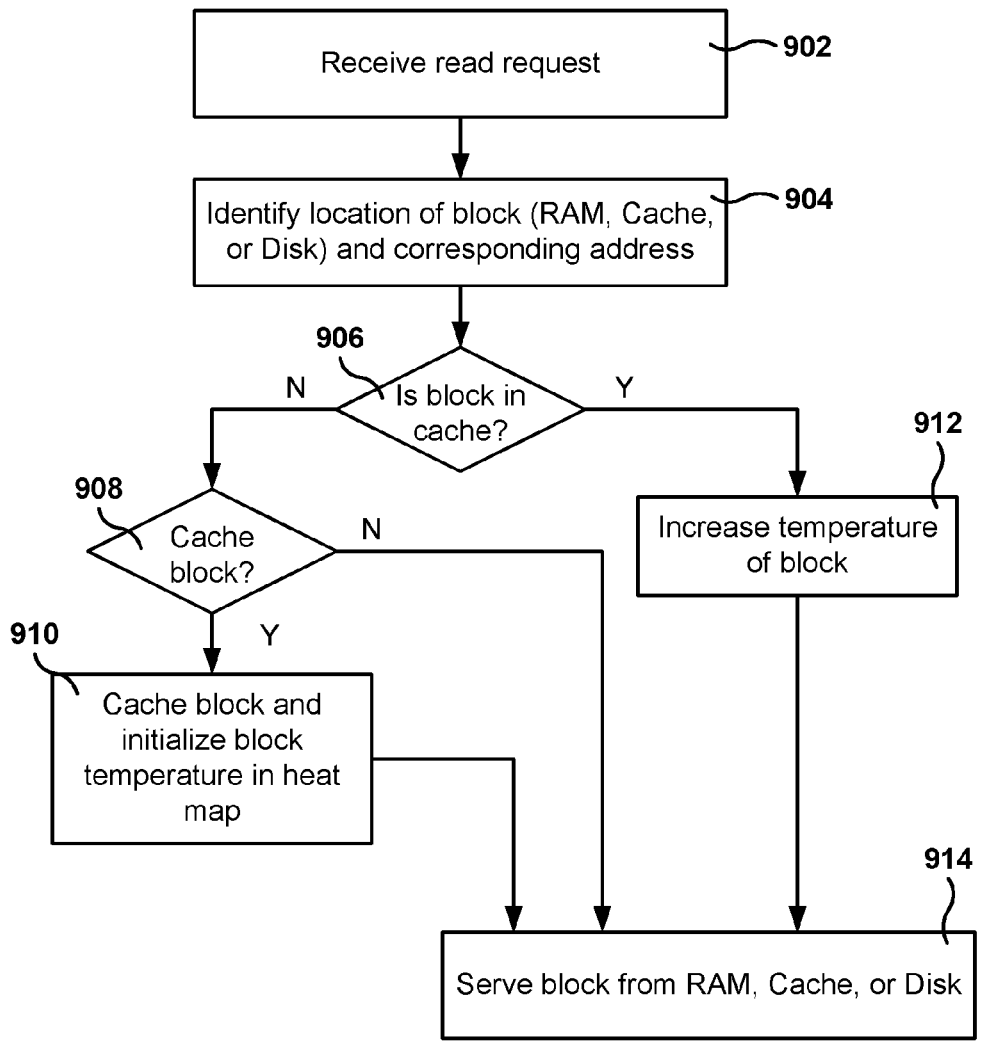
FIG. 9A is a flowchart for processing a read request, in accordance with one embodiment.

FIG. 9A is a flowchart for processing a read request, in accordance with one embodiment. While the various operations in the flowchart of FIGS. 9A-9C and 10 are presented and described sequentially, one of ordinary skill will appreciate that some or all of the operations may be executed in a different order, be combined or omitted, or be executed in parallel.

In operation 902, a read request is received by the storage array. In one embodiment, the read request includes a volume identifier, an offset, and an amount of data. From operation 102, the method flows to operation 904 where the controller identifies the location of the block of data associated with the read request. Of course, if more than one block is required to satisfy the read request, the operations described herein will be repeated for all the blocks.

The controller identifies if the block is stored in RAM, cache, or disk. In addition, the controller identifies the address of the block in the corresponding storage media. For example, if the block is in RAM, the controller identifies the RAM address of the block. If the block is in cache, the block identifies the segment and offset of the block in cache, and if the block is in disk, the block identifies the drive and location within the drive.

From operation 904, the method flows to operation 906 where a check is made to determine if the block is stored in cache. If the block is stored in cache the method flows to operation 912. If the block is not in cache the method flows to operation 908.

In operation 912, the temperature of the block is increased (unless the block temperature is already at a maximum) to reflect the new access performed to the block. From operation 912, the method flows to operation 914. In operation 908, a check is made to determine if the block should be cached in flash memory. If the block is to be cached, the method flows to operation 910, and if the block is not to be cached the method flows to operation 914.

In operation 910 block is cached and the block temperature is initialized in the heat map. In operation 914, the block is returned to the requester from RAM, or cache, or disk.

Figure 9B:
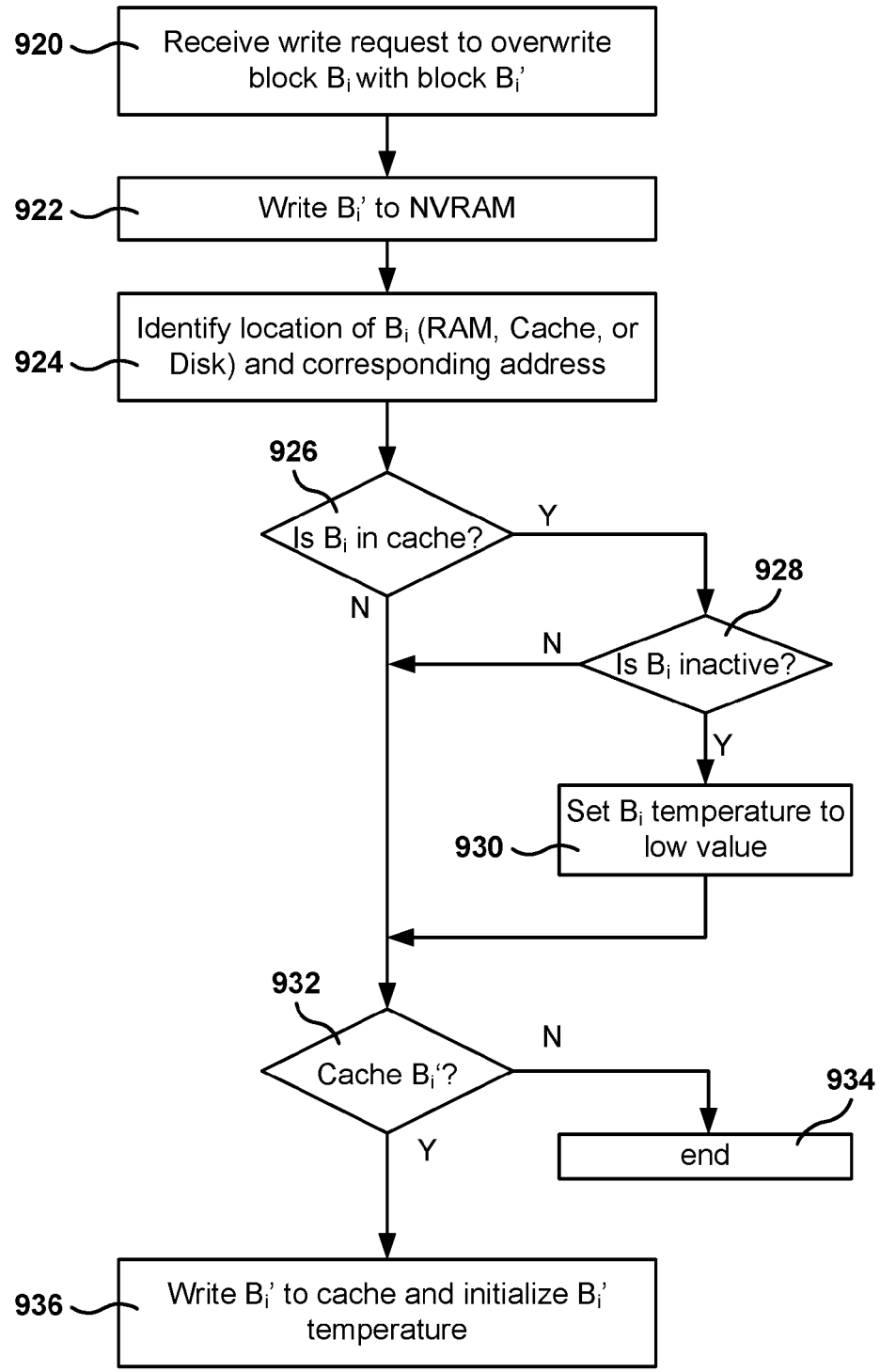
FIG. 9B is a flowchart for processing a write request, according to one embodiment.

FIG. 9B is a flowchart for processing a write request, according to one embodiment. In operation 920, the storage array receives a write request to write a block that overwrites block $B_i$. In operation 922, the new block Bi' is first written to INVRAM.

From operation 922, the method flows to operation 924 where the storage array identifies the location of the block $B_i$ being overwritten. The location may be in RAM, cache or disk. From operation 924, the method flows to operation 926 where a check is made to determine if block $B_i$ is in cache. If $B_i$ is in cache the method flows to operation 128, but if $B_i$ is not in cache the method flows to operation 932.

In operation 928, a check is made to determine if block $B_i$ is now inactive. For example, if block $B_i$ is active only in the volume from which $B_i$ is being overwritten, then $B_i$ will become inactive due to the overwrite operation. However, if block $B_i$ is still active (e.g., because the block is still active in another clone), the overwrite operation will not change the block temperature in operation 930. However, if the block is not inactive (i.e., the block is active) then the method flows to operation 932.

In operation 932, the controller determines if the new block $B_i'$ is cache worthy, i.e., if the block is going to be cached. If the block $B_i'$ is cache worthy, $B_i'$ is written to cache and the heat map for $B_i'$ is initialized. If is not to be cached, the write request ends 934. Of course, there may be other additional operations taking place unrelated to the heat map, such as sending the data back to the requester, which are not shown in the flowchart.

Figure 10:
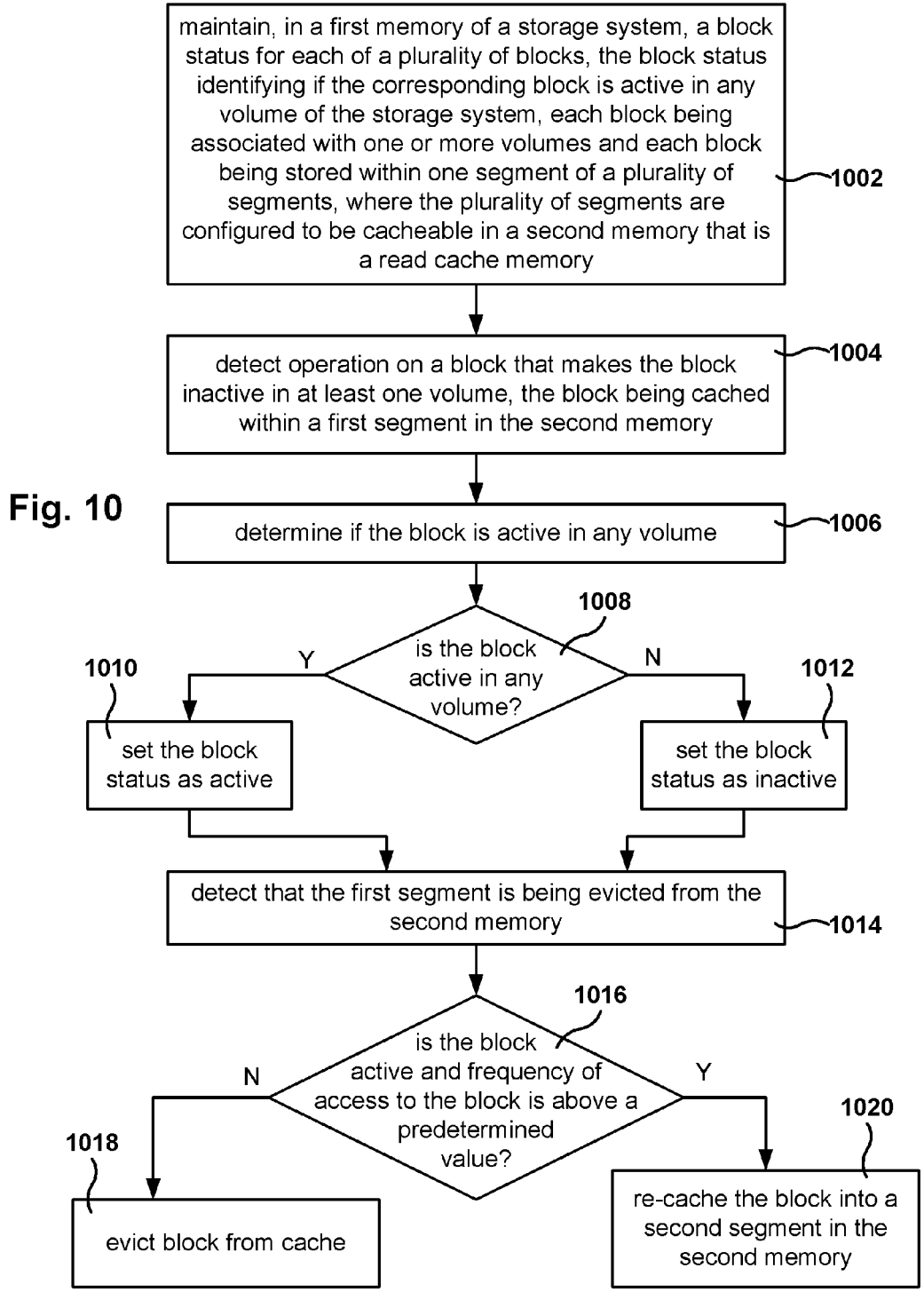
FIG. 10 is a flowchart for processing active blocks, according to one embodiment.

FIG. 10 is a flowchart for processing active blocks, according to one embodiment. While the various operations in this flowchart are presented and described sequentially, one of ordinary skill will appreciate that some or all of the operations may be executed in a different order, be combined or omitted, or be executed in parallel.

In operation 1002, the method maintains, in a first memory of a storage system, a block status for each of a plurality of blocks. The block status identify if the corresponding block is active in any volume of the storage system, each block being associated with one or more volumes and each block being stored within one segment of a plurality of segments. Further, the plurality of segments is configured to be cacheable in a second memory that is a read cache memory.

From operation 1002, the method flows to operation 1004 for detecting an operation on a block that makes the block inactive in at least one volume, the block being cached within a first segment in the second memory.

From operation 1004, the method flows to operation 1006 where the system determines if the block is active in any volume. In operation 1008, a check is made to determine if the block is active in any volume. If the block is active in any volume, the block status for the block is set to active 1010, but if the block is not active in any volume, the block status of the block is set to inactive 1012.

In operation 1014, the system detects that the first segment is being evicted from the second memory. From operation 1014, the method flows to operation 1016, where re-caching check is made to determine if the block status of the block is active and the frequency of access to the block is above a predetermined value. If the re-caching check is positive, the system re-caches the block into a second segment in the second memory 1020, but theif the re-caching check is negative, the system evicts the block from cache 1018.

Figure 11:
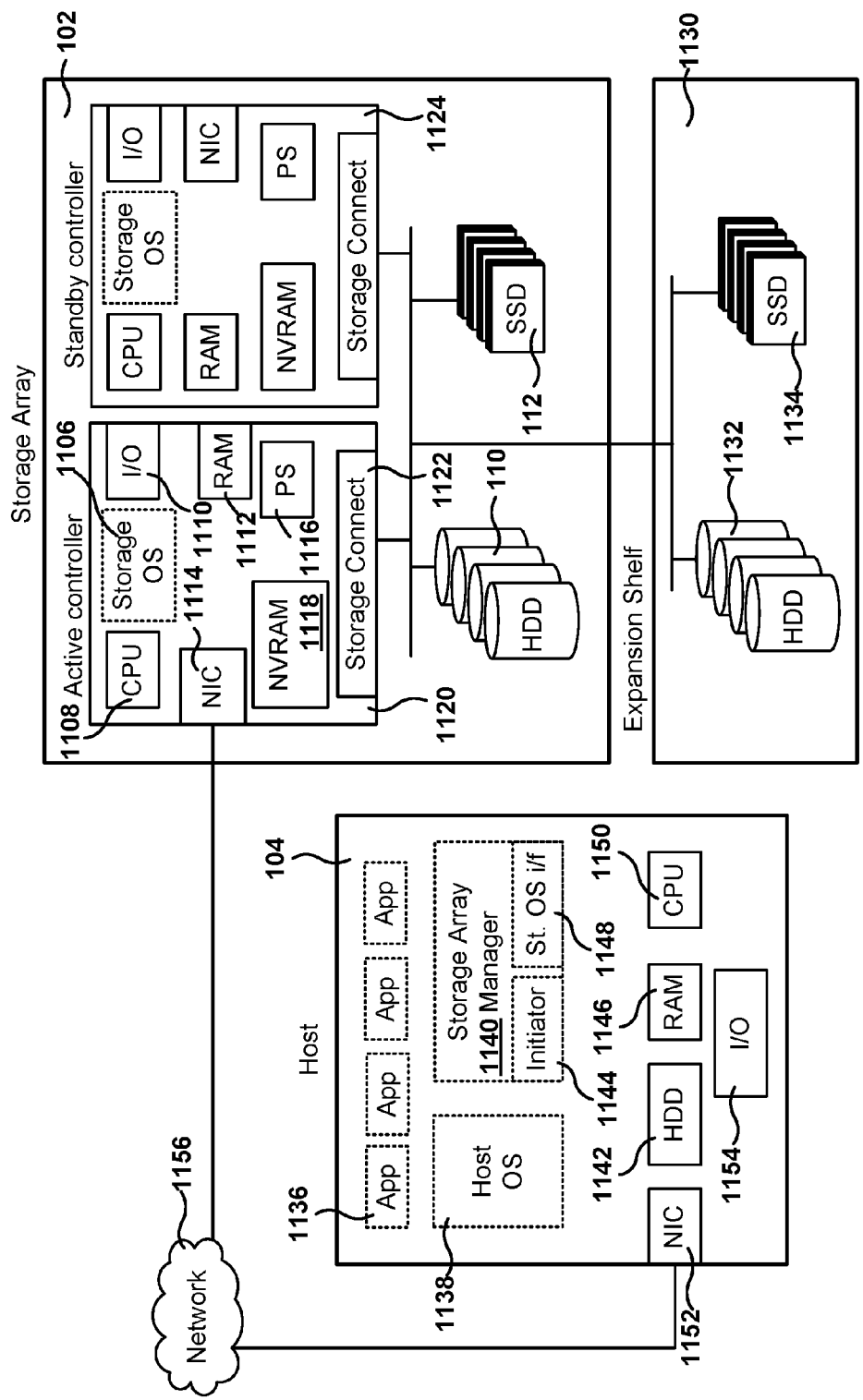
FIG. 11 illustrates an example architecture of a storage array 102, according to one embodiment.

FIG. 11 illustrates an example architecture of a storage array 102, according to one embodiment. In one embodiment, storage array 102 includes an active controller 1120, a standby controller 1124, one or more HDDs 110, and one or more SSDs 112. In one embodiment, the active controller 1120 may be positioned on a left side of an enclosure and the standby controller 1124 may be positioned on a right side of the enclosure for the storage array 102. In one embodiment, the controller 1120 includes non-volatile RAM (NVRAM) 1118, which is for storing the incoming data as it arrives to the storage array. After the data is processed (e.g., compressed and organized in segments (e.g., coalesced)), the data is transferred from the NVRAM 1118 to HDD 110, or to SSD 112, or to both.

In addition, the active controller 1120 further includes CPU 1108, general-purpose RAM 1112 (e.g., used by the programs executing in CPU 1108), input/output module 1110 for communicating with external devices (e.g., USB port, terminal port, connectors, plugs, links, etc.), one or more network interface cards (NICs) 1114 for exchanging data packages through network 1156, one or more power supplies 1116, a temperature sensor (not shown), and a storage connect module 1122 for sending and receiving data to and from the HDD 110 and SSD 112. In one embodiment, the NICs 1114 may be configured for Ethernet communication or Fibre Channel communication, depending on the hardware card used and the storage fabric. In other embodiments, the storage array 102 may be configured to operate using the iSCSI transport or the Fibre Channel transport.

Active controller 1120 is configured to execute one or more computer programs stored in RAM 1112. One of the computer programs is the storage operating system (OS) used to perform operating system functions for the active controller device. In some implementations, one or more expansion shelves 1130 may be coupled to storage array 102 to increase HDD 1132 capacity, or SSD 1134 capacity, or both.

Active controller 1120 and standby controller 1124 have their own NVRAMs, but they share HDDs 110 and SSDs 112. The standby controller 1124 receives copies of what gets stored in the NVRAM 1118 of the active controller 1120 and stores the copies in its own NVRAM. If the active controller 1120 fails, standby controller 1124 takes over the management of the storage array 102. When servers, also referred to herein as hosts, connect to the storage array 102, read/write requests (e.g., IO requests) are sent over network 1156, and the storage array 102 stores the sent data or sends back the requested data to host 104.

Host 104 is a computing device including a CPU 1150, memory (RAM) 1146, permanent storage (HDD) 1142, a NIC card 1152, and an IO module 1154. The host 104 includes one or more applications 1136 executing on CPU 1150, a host operating system 1138, and a computer program storage array manager 1140 that provides an interface for accessing storage array 102 to applications 1136. Storage array manager 1140 includes an initiator 1144 and a storage OS interface program 1148. When an IO operation is requested by one of the applications 1136, the initiator 1144 establishes a connection with storage array 102 in one of the supported formats (e.g., iSCSI, Fibre Channel, or any other protocol). The storage OS interface 1148 provides console capabilities for managing the storage array 102 by communicating with the active controller 1120 and the storage OS 1106 executing therein. It should be understood, however, that specific implementations may utilize different modules, different protocols, different number of controllers, etc., while still being configured to execute or process operations taught and disclosed herein.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 102, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
   maintaining, in a first memory of a storage system, a block status for each of a plurality of blocks, the block status identifying if the corresponding block is active in any volume of the storage system, each block being associated with one or more volumes and each block being stored within one segment of a plurality of segments, wherein the plurality of segments is configured to be cacheable in a second memory that is a read cache memory;
   whenever an operation on a block is detected that makes the block inactive in at least one volume, determining if the block is active in any volume, the block being cached within a first segment in the second memory;
   when the block is not active in any volume, setting the block status of the block as inactive;
   detecting that the first segment is being evicted from the second memory; and
   re-caching, in response to the eviction of the first segment, the block into a second segment in the second memory when the block status of the block is active and a frequency of access to the block is above a predetermined value.

2. The method as recited in claim 1, wherein re-caching the block into a second segment includes:
   creating the second segment;
   adding the block to the second segment;
   completing the second segment with other blocks; and
   caching the second segment in the second memory.

3. The method as recited in claim 1, wherein the frequency of access to the block is measured via a temperature associated with the block, wherein the temperature is increased when the block is accessed, and the temperature is decreased periodically.

4. The method as recited in claim 1, wherein the block is active in a volume when the block holds current data for the volume, wherein the block is inactive in the volume when the blocks holds data for the volume that is no longer current.

5. The method as recited in claim 1, wherein the operation making the block inactive is any one of overwriting the block, deleting the block, or deleting a volume holding the block.

6. The method as recited in claim 1, wherein the block is not re-cached when the block is not active in any volume.

7. The method as recited in claim 1, wherein the first memory is a random access memory (RAM), the second memory is a solid state drive (SSD) memory, and a third memory for storing segments is one or more hard disk drives (HDD).

8. The method as recited in claim 1, wherein a volume is a linear accessible storage area, wherein a unit for reading or writing to the volume is the block.

9. The method as recited in claim 1, wherein the block is readable without having to read the complete segment where the block resides.

10. The method as recited in claim 1, wherein at least one segment from the plurality of segments is configured to hold blocks from two or more different volumes.

11. A storage device comprising:
   a first memory configured to store a block status for each of a plurality of blocks, the block status identifying if the corresponding block is active in any volume of the storage system;
   a second memory for caching segments from a plurality of segments, the second memory being a read cache memory, wherein each block is associated with one or more volumes and each block is stored within one segment from the plurality of segments;
   a third memory for storing the plurality of segments; and
   a processor configured to detect when an operation on a block makes the block inactive in at least one volume, and determine if the block is active in any volume, the block being cached within a first segment in the second memory, wherein whenever an operation on a block is detected that makes the block inactive in at least one volume, the processor determines if the block is active in any volume, the block being cached within a first segment in the second memory;

wherein when the block is not active in any volume, the processor sets the block status of the block as inactive; and whenever the processor detects that the first segment is being evicted from the second memory, the processor re-caches the block into a second segment in the second memory if the block status of the block is active and a frequency of access to the block is above a predetermined value.

12. The storage device as recited in claim 11, wherein re-caching the block into a second segment includes:
creating the second segment;
adding the block to the second segment;
completing the second segment with other blocks; and
caching the second segment in the second memory.

13. The storage device as recited in claim 11, wherein the first memory is a random access memory (RAM), the second memory is a solid state drive (SSD) memory, and the third memory is one or more hard disk drives (HDD).

14. The storage device as recited in claim 11, wherein data is stored in the second memory and in the third memory in segments.

15. The storage device as recited in claim 11, wherein the frequency of access to the block is measured via a temperature associated with the block, wherein the temperature is increased when the block is accessed, and the temperature is decreased periodically.

16. The storage device as recited in claim 11, wherein the block is active in a volume when the block holds current data for the volume, wherein the block is inactive in the volume when the blocks holds data for the volume that is no longer current.

17. A non-transitory computer-readable storage medium storing a computer program, the computer-readable storage medium comprising:

program instructions for maintaining, in a first memory of a storage system, a block status for each of a plurality of blocks, the block status identifying if the corresponding block is active in any volume of the storage system, each block being associated with one or more volumes and each block being stored within segment of a plurality of segments, wherein the plurality of segments is configured to be cacheable in a second memory that is a read cache memory;

program instructions for, whenever an operation on a block is detected that makes the block inactive in at least one volume, determining if the block is active in any volume, the block being cached within a first segment in the second memory;

program instructions for, when the block is not active in any volume, setting the block status of the block as inactive;

program instructions for detecting that the first segment is being evicted from the second memory; and program instructions for re-caching, in response to the eviction of the first segment, the block into a second segment in the second memory when the block status of the block is active and a frequency access to the block is above a predetermined value.

18. The storage medium as recited in claim 17, wherein re-caching the block into a second segment includes:

program instructions for creating the second segment;

program instructions for adding the block to the second segment;

program instructions for completing the second segment with other blocks; and program instructions for caching the second segment in the second memory.

19. The storage medium as recited in claim 17, wherein the frequency of access to the block is measured via a temperature associated with the block, wherein the temperature is increased when the block is accessed, and the temperature is decreased periodically.

20. The storage medium as recited in claim 17, wherein the block is active in a volume when the block holds current data for the volume, wherein the block is inactive in the volume when the blocks holds data for the volume that is no longer current.

* * * * *